Figure 1:
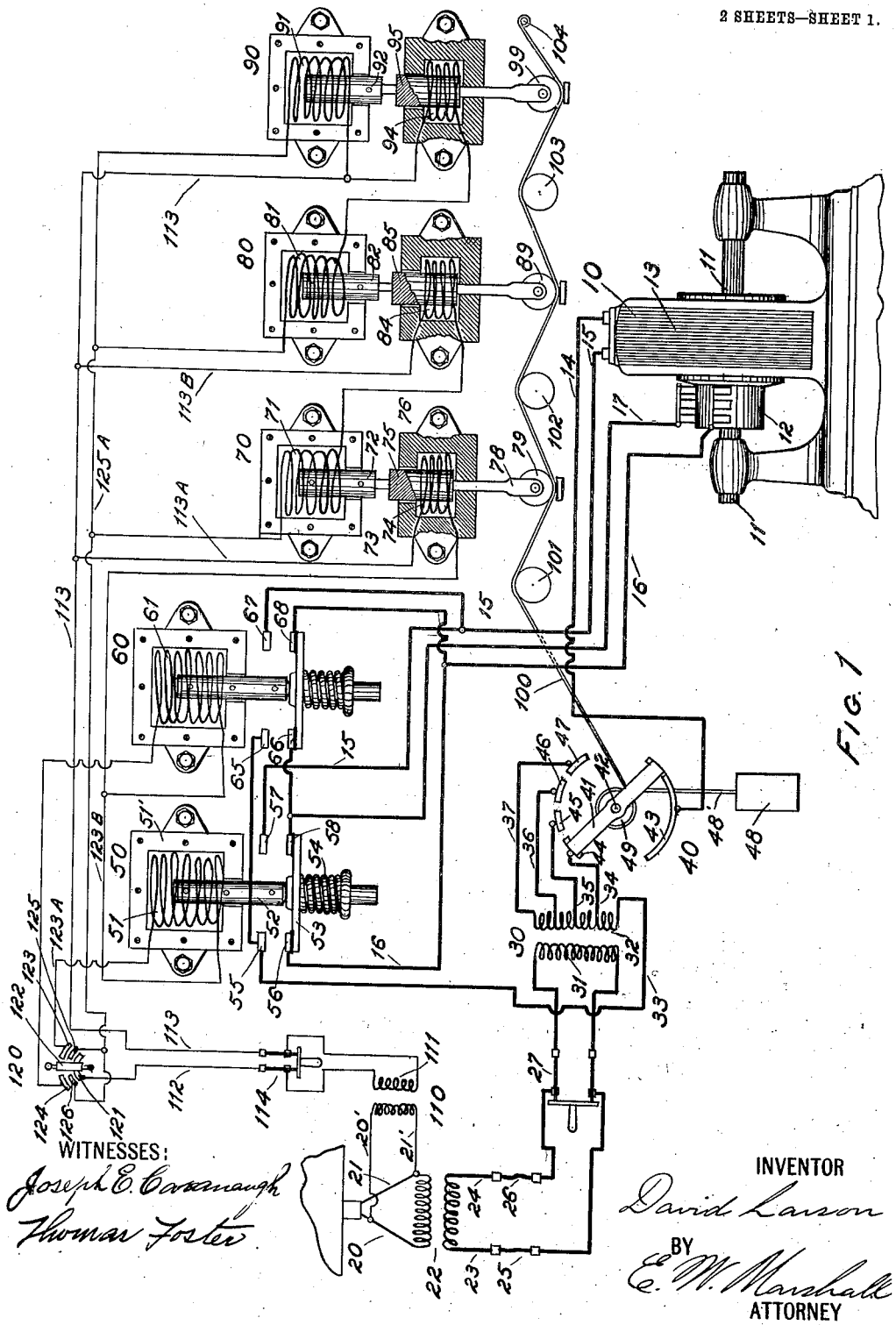

No. 827,925. PATENTED AUG. 7, 1906.
D. LARSON.
ELECTRICAL CONTROLLER.
APPLICATION FILED SEPT. 8, 1905.

2 SHEETS—SHEET 1.

WITNESSES:
Joseph E. Cavanaugh
Thomas Foster

INVENTOR
David Larson
BY
E. W. Marshall
ATTORNEY

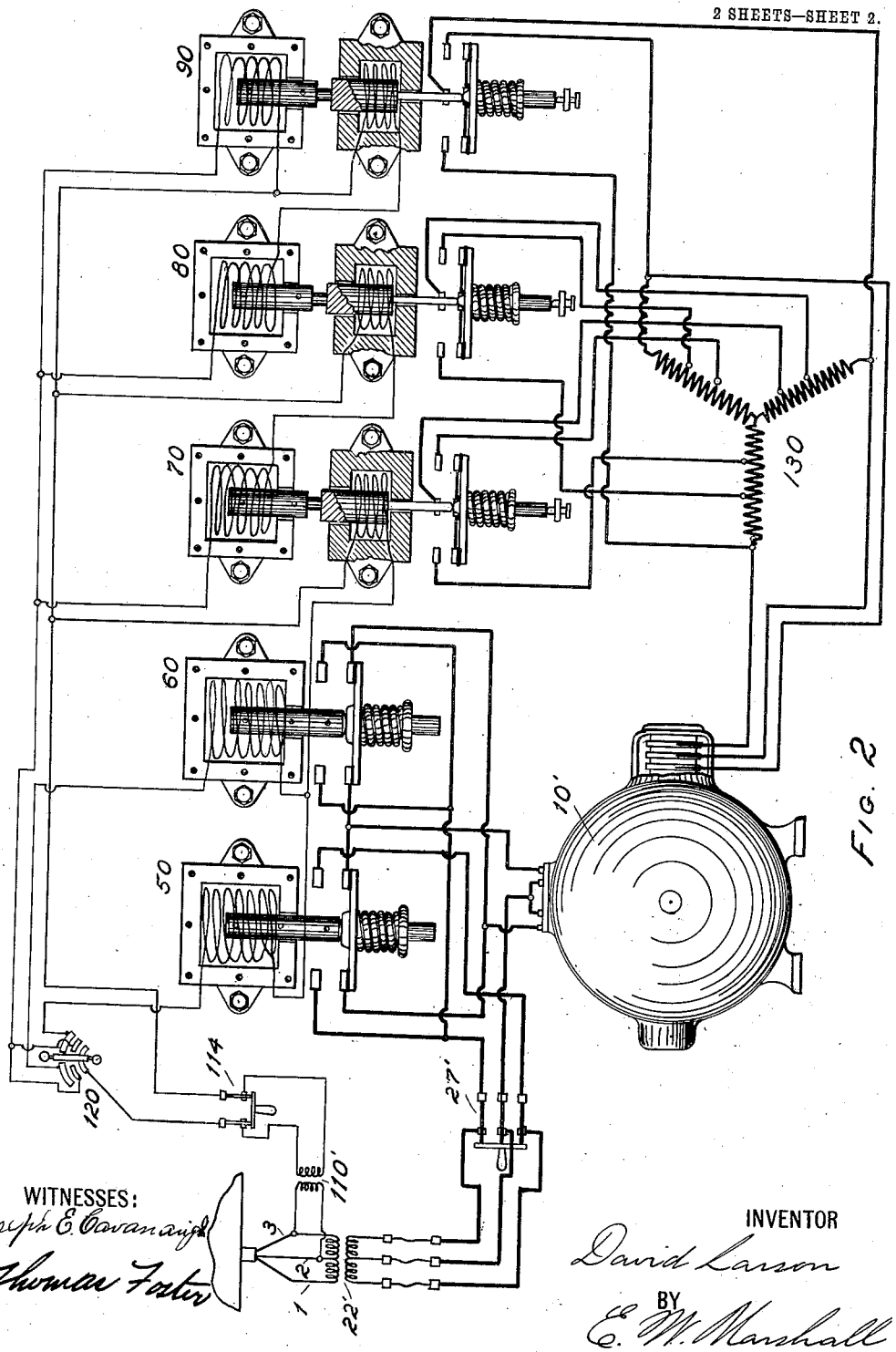

UNITED STATES PATENT OFFICE.

DAVID LARSON, OF YONKERS, NEW YORK.

ELECTRICAL CONTROLLER.

No. 827,925. Specification of Letters Patent. Patented Aug. 7, 1906.

Application filed September 8, 1905. Serial No. 277,485.

*To all whom it may concern:*

Be it known that I, DAVID LARSON, a subject of the King of Sweden and Norway, and a resident of the city of Yonkers, in the county of Westchester and State of New York, have invented certain new and useful Improvements in Electrical Controllers, of which the following is a specification.

My invention relates to electrical controllers for use with alternating, intermittent, or pulsating currents; and it consists in the novel construction and arrangement herein shown and described.

I will describe my invention in the following specification and point out the novel features thereof in claims.

Referring to the drawings, Figure 1 represents in side elevation an electric motor and certain other apparatus, parts of which are shown partly in section, with certain electrical circuits for single-phase currents and mechanical connections shown diagrammatically. Fig. 2 shows an electric motor and various other apparatus embodying my invention as applied to multiphase circuits.

Like characters of reference designate corresponding parts in both of the figures.

10 in Fig. 1 designates an electric motor of the series type having a shaft 11, a commutator 12, and fields 13, which are preferably of laminated magnetic material.

20 21 designate mains from a suitable source of current-supply—for example, from a generator of single-phase alternating current. These mains lead to a transformer 22 and thence through mains 23 24, through fuses 25 26 and a main-line switch 27 to the primary 31 of a regulating-transformer 30. The secondary 32 of this regulating-transformer is divided into a number of sections and is connected by conductors to various apparatus in the manner which will now be pointed out.

One end of the secondary 32 is connected by a conductor 33 to stationary contacts 55 and 65 of an electrically-actuated reversing-switch, which will be described later, and its other end are intermediate points and its other end are connected by conductors 34, 35, 36, and 37 to stationary contacts 44, 45, 46, and 47, respectively, of a speed-regulating switch 40. This switch comprises an arm 41, which is pivoted at 42 and mounted upon a pulley 49 and which is arranged to connect the stationary contacts 44, 45, 46, and 47 successively with a segmental fixed contact 43. The latter contact, as shown, is connected by a conductor 14 to one of the series field terminals of motor 10, the other terminal of which is connected by conductor 15 to stationary contacts 57 67 of the reversing-switch.

A weight 48 is shown connected to the pulley 49 by a belt or flexible cable 48' and has a tendency to move the pulley and its attached pivoted arm 41 in one direction. Its movement is, however, checked and controlled by a flexible band 100, which is attached at 104 to a fixed point and which passes alternately under movable pulleys 99, 89, and 79 and over fixed pulleys 103, 102, and 101. The movable pulleys are attached to and form a part of an electroresponsive device, which will be fully described later, by means of which the flexible band and the pivoted arm 41, to which it is connected, are moved.

50 and 60 designate two parts of an electromagnetically-actuated reversing-switch for the motor.

51 designates a coil or winding which is adapted to carry a comparatively heavy alternating current. When a current is sent through this winding 51, it is arranged to energize and set up magnetic lines of force in a frame 51', which is constructed, preferably, of laminated magnetic material. When frame 51' is energized, it will raise a loose core 52, which is also of laminated magnetic material, and this core when raised will short-circuit some of the lines of force in magnet-frame 51'. This will increase the impedance of coil 51, and thereby cut down the amount of current which is passing through it. When core 52 is raised, it allows a plate 53, which carries upon it two insulated contacts 56 and 58, to be pushed up by a spring 54 against two stationary contacts 55 and 57, respectively. This will close certain circuits to the motor 10 and will cause the latter to begin to rotate.

The transformer 20 is arranged to supply a suitable voltage to the motor-circuits. It is connected, as before pointed out, to a regulating-transformer 30. The current which is induced in the secondary 32 of this transformer is that which is supplied to the motor when the contacts of starting-switch 50 of the motor-reversing switch are closed. The lower end of this secondary 32 is now connected through conductor 33, contacts 55 56, and conductor 16 to one of the brushes of the motor. A current will now pass through the motor-armature, thence through conductor 17, contacts 58 57, conductor 15, through the field-windings of the motor, and out through conductor 14 to contact 43 of regulating-switch 40, through pivoted arm 41, stationary contact 44, and conductor 34 back to the secondary 32. Thus that part of the secondary 32 of transformer 30 which lies between conductors 33 and 34 is connected in circuit with the motor 10 and supplies the latter with current of comparatively low voltage. When pivoted arm 41 is moved over onto stationary contacts 45, 46, and 47, more and more and finally all of the secondary 32 is included in the motor. In this way the voltage and current supplied to the motor is increased and its acceleration is governed. It may be seen, then, that the regulating-transformer 30 constitutes an opposition element in the motor-circuit which controls the flow of current in this circuit. Other means may be used to accomplish this same function—for example, an impedance-coil may be used or a resistance such as that shown at 130 in Fig. 2.

When the current through winding 51 is cut off, the magnet becomes deënergized and allows the core 52 to drop. By its weight the core will compress spring 54 and cause the contacts 56 58 to be moved away from the stationary contacts 55 57. This of course will cut off the current from the motor and cause it to stop rotating. When the starting switch 60 is energized, the action will be similar; but in this case the insulated contacts 66 68 will be brought into contact with stationary contacts 65 67 and the circuits will be closed in such a way as to cause the current to flow through the motor-armature in the opposite direction to that previously pointed out, and this will cause the motor to rotate in the opposite direction.

At 110 I have shown an independent transformer, the function of which is to supply the various controlling-circuits, (designated in the diagram by light lines) with current at a suitable voltage. The primary of this transformer may be connected to the mains 20 21 by conductors 20' 21'. Its secondary 111 is connected to the various controlling-circuits by conductors 112 113, which may pass through a hand-switch 114.

The controlling-circuits may be further controlled by means of a manually-operated switch 120, which may be placed in any convenient location. The windings 51 61 of the reversing-switch may be energized at will by moving this manually-operated switch 120 to the right or left. This switch 120 comprises a pivoted arm 122, which rests upon a stationary contact 121 and which is adapted to be moved into certain other stationary contacts which I will now point out. Contact 121 is connected to the secondary of transformer 110 by conductor 112. When the pivoted arm 122 is moved to the right, it first comes in contact with stationary contact 123, and thereby closes a cicuit which extends from the switch 120 through a conductor 123$^A$, through winding 51, conductor 123$^B$, through winding 74 of an electromagnetic holding device which will be described later, and thence by conductor 113$^A$ to the conductor 113, which is connected to the other end of secondary 111 of transformer 110. Thus the windings 51 and 74 will be energized and the magnet-core or magnetic armature 52 will be raised, as already pointed out. A movement of pivoted arm 122 to the left would have a similar effect; but in this case contact 121 would have been connected to contact 124 and a circuit would have been closed through windings 61 and 74. This would cause contacts 66 68 to be closed against contacts 65 67, which would complete circuits through the motor 10 in the same manner as that before described, but in this case with the connections to the armature reversed, and would cause the motor to rotate in the opposite direction. A further movement of pivoted arm 122 to the right or left will bring it into contact with stationary contacts 125 or 126. These are connected together and by a conductor 125$^A$ to upper terminals of the windings 71, 81, and 91 of three electromagnets 70, 80, and 90. The lower terminal of magnet 70 is connected to the winding 84 of an electromagnetic holding device under magnet 80 through the winding and by conductors 113$^B$ and 113 to the lower end of secondary 111 of transformer 110. The lower end of winding 81 is similarly connected through winding 94 to conductor 113, and the lower end of winding 91 is directly connected to conductor 113. Thus it may be seen that whenever the pivoted arm 122 of switch 120 is moved way over to the right or left one of the magnets 50 or 60 and all of the magnets 70, 80, and 90, together with the windings 74, 84, and 94, will be energized by the current from transformer 110.

It may be seen that the construction of the upper parts of magnets 70, 80, and 90 is similar to that of magnets 50 and 60. The core 72 of magnet 70 is preferably constructed of laminated magnetic material. Another core 75 of magnetic material, but preferably not laminated, is placed below and connected to the core 72. This core 75 is a part of an electromagnetic holding device which is used to time the action of magnet 70. This holding device comprises a frame 76 of magnetic material and a winding 74, which has been pointed out before, the purpose of which is to energize frame 76 when sufficient current is passing through it and cause it to attract and hold its core 75 and its connected parts against the pull of magnet 70. Magnets 80 and 90 are also supplied with similar holding devices.

It has been shown that when switch 120 has been operated the winding 51 or the winding 61 and all of the windings 71 81 91 and 74 84 94 may be energized. The effect of this will be that magnets 50 or 60 and magnets 70, 80, and 90 will tend to lift their cores. The holding devices under magnets 70, 80, and 90 are, however, energized and prevent these three magnets from lifting their cores.

It has previously been shown that whenever core 52 or core 62 has been raised by its particular magnet it will short-circuit some of the magnetic lines of force, and thereby reduce the current flowing through its winding and through the winding 74 of the holding device under magnet 70. This reduction of current in winding 74 will deënergize the frame 76 sufficiently for it to allow the core 72 to raise the core 75. As the frame and core of the holding device are preferably made of solid material, it will take an appreciable length of time for them to lose their magnetism. When the core 72 is drawn up within coil 71, it acts in the manner previously described to reduce the current flowing through magnet-winding 71 and winding 84 of the holding device under magnet 80. This will still allow enough current to pass through winding 71 to energize magnet 70 a sufficient amount for it to retain its core 72 in raised position; but this current will not be enough to energize the holding device under magnet 80 sufficiently for the latter to hold its core 85 and its attached parts down against the pull of magnet 80. Consequently magnet 80 will raise its core 82 and in doing so will automatically reduce the current flowing through its winding 81 and the winding 94 of the holding device under magnet 90 and allow magnet 90 to raise its core 92 and its connected parts. The result of this action will be first the raising of the core of either magnet 50 or 60, then that of magnets 70, 80, and 90 in a series of steps with an interval of time between them. This interval of time is dependent upon the time constant of the holding devices and this is a matter of design.

The movable rollers 79, 89, and 99 are connected, respectively, to the cores 72, 82, and 92. When the magnet 70 raises its core 72 and the roller 79, it allows the weight 48 to move pivoted arm 41 of regulating-switch 40 from contact 44 to contact 45. When magnet 80 raises roller 89, it allows pivoted arm 41 to be moved onto contact 46, and when magnet 90 raises roller 99 it allows pivoted arm 41 to be moved onto contact 47. In this way the regulating-switch 40 is given a step-by-step movement at intervals dependent upon the time constant of the holding devices and the regulating-transformer 30 supplies an increasing voltage to the motor, and thereby controls its acceleration. During this operation the flexible band 100 will be straightened out. When the hand-switch 120 is moved back to its neutral position and the current is thereby cut off from magnets 70, 80, and 90, they will become deënergized and will allow their cores, with their connected parts, to drop. This will bring the rollers 79, 89, and 99 down again against the flexible band 100 and will cause it to again assume the zigzag position in which it is shown in the drawings and to move pivoted arm 41 back to its original position. It may be seen that in this way the circuit-closer is controlled by the armatures or cores 72, 82, and 92 of electromagnets, but that these cores are disconnected from said circuit-closer.

Fig. 2 shows my invention applied to a multiphase motor 10. In this case the motor is supplied by mains 1, 2, and 3 from a suitable source of multiphase alternating-current supply, which are connected to a transformer 22', which is arranged to supply the motor-circuits through a manually-operated switch 27' with a current at a suitable voltage. A separate transformer 110' may be connected to two of the mains, as 2 and 3, and may be arranged to supply the controlling-circuits through a hand-switch 114 and a manually-operated master-switch 120 with a single-phase current at suitable voltage. The magnets 50 and 60 of the reversing-switch and the magnets 70, 80, and 90, with their respective holding devices, are arranged as previously described. The magnets 70, 80, and 90 are in this case arranged to short-circuit a resistance 130 in the rotor-circuits of motor 10' in a series of steps. The magnet cores or armatures are in this case also arranged to control the circuit-closers, but are disconnected from the moving parts of the circuit-closers. I will not describe this in detail, as this arrangement has been shown merely to show that my invention is applicable to other arrangements and devices than those previously described.

It is believed that it is broadly new to control the action of one magnetic device by the amount of current flowing through another magnetic device. It is believed that it is also new to time the action of one magnetic device by a magnetic retarding or holding device energized by the current which energizes another magnetic device and to so arrange the parts that the effect of the current in one magnetic device will be to so increase the reactance of the circuit that it will reduce the current in the circuit, and thereby modify its effect upon another part of the circuit. This invention has many other novel features which may be seen from the claims which follow. It has been shown as applied to two forms of motor-controlling devices, one of which is shown for single-phase currents and the other for multiphase currents. It is applicable as well to other devices and for many other uses in conjunction with alternating, pulsating, or intermittent circuits.

In using the term "stationary transformer" in the claims I wish to be understood to mean a transformer having rigid parts in contradistinction from transformers of the rotary type.

By arranging the magnets which control the circuit-closers in such a way that their cores are raised above the moving parts which control the circuit-closers this arrangement is particularly adaptable for use in connection with alternating currents. This is because any vibrations which may be present in the cores or armatures of the magnet, due to the current alternations, will not be transmitted to the circuit-closers. This has been a serious drawback in former apparatus of this kind, and the present invention entirely overcomes any chattering of the parts of the circuit-closers with its attendant sparking and other injurious effects.

Where I state in some of the claims that one transformer is used for obtaining a suitable high voltage for the motor-circuits and another transformer is used for obtaining a low voltage for the controlling-circuits, I mean that the motor-circuits are supplied with a voltage comparatively higher than that which is supplied to the controlling-circuits. It is customary in many cases to operate electric motors with a current which is of sufficiently-high voltage that it would be dangerous to lead it to a controlling-switch, and it is one of the purposes of this invention to provide a sufficiently-low voltage for the controlling-circuits to make it absolutely safe and yet permit the current which is led to the motor to be of considerably higher voltage. A lower voltage is also more suitable for the magnet-spools of controllers and with it there is less danger of leakage between conductors and of destructive sparking at contact-points. With this arrangement a leakage in the motor-transformer would not endanger the operator or interfere with the motor-controlling device.

What I claim is—

1. An electroresponsive device comprising an electromagnet having a winding, and a second electromagnet having an electromagnetic holding device, said holding device being dependent upon the current in the winding of the first magnet.

2. An electro-responsive device comprising an electromagnet having a winding, and a plurality of other electromagnets each having a winding and an electromagnetic holding device, each of said holding devices being in circuit with the winding of the preceding magnet and dependent upon the current therein.

3. An electroresponsive device comprising an electromagnet having a core and a winding, a second electromagnet having a core and an electromagnetic holding device, and a winding for said holding device, said winding being in circuit with the winding of the first magnet.

4. An electroresponsive device comprising an electromagnet having a core and a winding, a second electromagnet having a core and an electromagnetic holding device, and a winding for said holding device, said winding being in circuit with the winding of the first magnet, means for sending an alternating current through said windings and thereby raising the core of the first magnet, and means dependent upon the movement of the core for reducing the current in the windings.

5. An electroresponsive device comprising an electromagnet having a core and a winding, contacts arranged to be closed or opened upon a movement of said core, a second electromagnet having a core and a winding, an electromagnetic holding device, a winding for said holding device, said winding being in circuit with the winding of the next preceding magnet, means for sending an alternating current through the said windings of the first magnet and the holding device of the next magnet and thereby moving the core of the first magnet, means dependent upon the movement of said core for reducing the current in said windings and allowing the second magnet to move its core.

6. An electroresponsive device comprising a magnet having a core and a winding, contacts actuated by a movement of said core, and a plurality of other electromagnets each having a core, a winding, contacts actuated by a movement of the core, and an electromagnetic holding device having a winding, the winding of each holding device being in circuit with the winding of the next preceding magnet, means for sending an alternating current through the windings, and means dependent upon the movement of a core for reducing the current in the winding of its corresponding magnet and in the holding device of the next subsequent magnet.

7. An electroresponsive device comprising a magnet having a core and a winding, contacts actuated by a movement of said core, and a plurality of other electromagnets each having a core, a winding, and an electromagnetic holding device having a winding, the winding of each holding device being in circuit with the winding of the next preceding magnet, means for sending an alternating current through the windings, and means dependent upon the movement of a core for reducing the current in the winding of its corresponding magnet and in the holding device of the next subsequent magnet and allowing the next subsequent magnet to move its core.

8. An electroresponsive device comprising an electromagnet having a core and a magnet-frame of laminated magnetic material adapted to carry magnetic lines of force, and a winding, a second electromagnet having an electromagnetic holding device, a winding for said holding device, said winding being in circuit with the winding of the first magnet, and means for sending an alternating current through said windings and thereby causing the core of the first magnet to be moved, said core being arranged to short-circuit the magnetic lines in the magnet and to thereby reduce the current in said windings.

9. An electroresponsive device comprising an electromagnet having a core and magnet-frame of laminated magnetic material adapted to carry magnetic lines of force, and a winding, a second electromagnet having an electromagnetic holding device, a frame of solid magnetic material, and a winding for said holding device, said winding being in circuit with the winding of the first winding, and means for sending an alternating current through said windings and thereby causing the core of the first magnet to be moved, said core being arranged to short-circuit the magnetic lines in the magnet and to thereby reduce the current in said windings.

10. A plurality of electromagnets, windings therefor, means for sending an electric current through said windings, means actuated by such current for increasing the impedance of said windings, and means dependent upon such increase of impedance in one magnet for timing the action of the next succeeding magnet.

11. A plurality of electromagnets each having a frame of laminated magnetic material and a core of laminated magnetic material, and an electric circuit adapted to allow an electric current to pass through it, said magnets arranged to be energized thereby and to move said cores, means dependent upon the movement of said cores for closing magnetic lines and thereby reducing the current in said circuits, and electromagnetic holding devices for some of the magnets, said holding devices being governed by the current in the circuit of another magnet than that to which it is applied.

12. A plurality of electromagnets each having a frame of laminated magnetic material and a core of laminated magnetic material, and an electric circuit adapted to allow an electric current to pass through it, said magnets arranged to be energized thereby and to move said cores, means dependent upon the movement of said cores for closing magnetic lines and thereby reducing the current in said circuits, and electromagnetic holding devices for some of the magnets, said holding devices having frames of solid magnetic material and windings in series with the circuits of the next preceding magnet.

13. A series of electromagnets each having a primary and a secondary magnetic circuit, the primary magnetic circuit of one magnet being arranged to control the strength of the secondary magnetic circuit of the next magnet.

14. In a system of motor control, a source of alternating-current supply, a motor, motor-circuits and controlling-circuits, a stationary inductive transformer for the motor and motor-circuits arranged to give a comparatively high voltage, and a second stationary inductive transformer for the controlling-circuits arranged to give a comparatively low voltage, the circuits of the secondary of said second transformer being metallic and entirely disconnected from the source of supply and from the ground.

15. A source of alternating-current supply, a motor, a controlling device therefor, means for obtaining a suitable high voltage for the motor and other means for obtaining a suitable low voltage for the controlling device, said means consisting of stationary inductive transformers, said controlling device being inductively associated with but entirely disconnected from the source of supply and from the ground.

16. A source of alternating-current supply, a motor, a controlling device therefor, circuits for the motor, circuits for the controlling device, means for obtaining a suitable high voltage for the motor-circuits and an independent stationary inductive transformer for obtaining a suitable low voltage for the controlling-circuits, said controlling-circuits being metallic and being inductively associated with but entirely disconnected from the source of supply and from the ground.

17. A source of alternating-current supply, a motor, a controlling device therefor, circuits for the motor, a switch for controlling the motor-circuits, circuits for the controlling device, a switch for controlling the controlling-circuits, a stationary inductive transformer for obtaining a suitable high voltage for the motor-circuits, and an independent stationary inductive transformer for obtaining a suitable low voltage for the controlling-circuits, said controlling-circuits being metallic and being inductively associated with but entirely disconnected from the source of supply and from the ground.

18. A source of multiphase alternating-current supply, a motor, a controlling device therefor, circuits for the motor, circuits for the controlling device, means for obtaining a multiphase current at suitable high voltage for the motor-circuits, and means for obtaining a single-phase current at suitable low voltage for the controlling-circuits, said means consisting of stationary inductive transformers, and said controlling-circuits being metallic and being inductively associated with but entirely disconnected from the source of supply and from the ground.

19. A motor, a controlling device therefor, a source of electrical supply, said source being divided into two parts, a stationary inductive transformer for high voltage through which one of said parts is led to the motor, and an independent stationary inductive transformer for low voltage through which another of said parts is led to the controlling device, the circuits of the secondary of said second transformer being metallic and being entirely disconnected from the source of supply and from the ground.

20. A motor, a source of alternating-current electrical supply, a motor-circuit, means in said circuit for regulating the flow of current to the motor, a series of electromagnets, and alternating-current electromagnetic retarding devices for the magnets and retarding devices, said magnets being operated by said source of supply and arranged to control said regulating means.

21. A motor, a starting-switch therefor, a source of electrical supply, a motor-circuit, a voltage-regulator in said circuit, a series of electromagnets, and electromagnetic retarding devices for the magnets, said magnets being arranged to control the voltage-regulator in a series of steps.

22. A motor, a reversing-switch therefor, a source of electrical supply, a motor-circuit, a voltage-regulator in said circuit, a series of electromagnets, and electromagnetic retarding devices for the magnets, said magnets being arranged to control the voltage-regulator in a series of steps.

23. A motor, an electrically-actuated reversing-switch therefor, a source of electrical supply, a motor-circuit, a voltage-regulator in said circuit, a series of electromagnets, electromagnetic retarding devices for the magnets, said magnets being arranged to control the voltage-regulator in a series of steps, and a manually-operated switch arranged to control the movement of the motor.

24. A motor, a source of electrical supply, a motor-circuit, a regulating-transformer, a regulating-switch therefor, a series of electromagnets, and electromagnetic retarding devices for the magnets, said magnets being arranged to control said regulating means.

25. A motor, a source of electrical supply, a motor-circuit, a regulating-transformer, a regulating-switch therefor, a series of electromagnets mechanically connected to said switch, inductive timing devices for the magnets, and means for automatically controlling the current in the magnets.

26. A motor, a source of electrical supply, a motor-circuit, a regulating-transformer, a regulating-switch therefor, a series of electromagnets mechanically connected to said switch, inductive timing devices for the magnets, means for automatically controlling the current in the magnets, and other means for controlling said current by hand.

27. A motor, a source of electrical supply, motor-circuits, controlling-circuits, an electrically-actuated reversing-switch in the controlling-circuits for the motor, a regulating-transformer in the motor-circuits, a regulating-switch therefor, a series of electromagnets in the controlling-circuits mechanically connected to said regulating-switch, inductive timing devices for the magnets, means for causing the magnets to actuate their cores one by one, and a manually-operated switch in the controlling-circuits arranged to control the reversing-switch and the series of electromagnets.

28. A motor, a source of electrical supply, motor-circuits, controlling-circuits, means for supplying the motor-circuits with suitable voltage, other means for supplying the controlling-circuits with suitable voltage, an electrically-actuated reversing-switch in the controlling-circuits for the motor, a regulating-transformer in the motor-circuits, a regulating-switch therefor, a series of electromagnets in the controlling-circuits mechanically connected to said regulating-switch, inductive timing devices for the magnets, means for supplying current to the magnets one by one, and a manually-operated switch in the controlling-circuits arranged to control the reversing-switch and the series of electromagnets.

29. A motor, a source of alternating-current electrical supply, a controlling device arranged to control the acceleration of the motor, a plurality of alternating-current electromagnets, alternating-current electromagnetic devices arranged to time the action of the magnets, said magnets being arranged to control said controlling device and independent armatures for the magnets and the timing devices.

30. A motor, a source of electrical supply, a motor-circuit, a regulating-transformer, a series of electromagnets and electromagnetic retarding devices for the magnets, said magnets being arranged to control the regulating means.

31. A motor, a source of electrical supply, a motor-circuit, a regulating-transformer, a series of electromagnets, inductive timing devices for the magnets and means for inductively controlling the magnets automatically.

32. A motor, a source of electrical supply, a motor-circuit, a regulating-transformer, a series of electromagnets, inductive timing devices for the magnets, means for inductively controlling the current in the magnets automatically, and other means for controlling said current by hand.

33. An alternating-current motor, an electromagnetic controlling device therefor, said controlling device comprising circuit-closers, electromagnets therefor, said electromagnets having fields of laminated magnetic material and armatures of laminated magnetic material, said armatures being disconnected from the circuit-closers but arranged to control the same.

34. An alternating-current motor, an electromagnetic controlling device therefor comprising a plurality of circuit-closers and a plurality of magnets, said magnets having fields of laminated magnetic material, windings for single-phase circuits and armatures of laminated magnetic material, said armatures being disconnected from the circuit-closers but arranged to control the same.

35. A source of alternating-current supply, an alternating-current motor arranged to be energized thereby, a controlling device for the motor, said controlling device comprising an electroresponsive device arranged to be energized by alternating current from the same source of supply as the motor but at a lower voltage, said controlling device being inductively associated with but entirely disconnected from the source of supply and from the ground.

36. A source of alternating-current supply, an alternating-current motor arranged to be energized thereby, a controlling device for the motor, said controlling device comprising a plurality of electromagnets arranged to be energized by alternating current and to be actuated step by step from the same source of supply as the motor but at a lower voltage, said controlling device being inductively associated with but entirely disconnected from the source of supply and from the ground.

37. A source of alternating-current supply, an alternating-current motor arranged to be energized thereby, a controlling device for the motor, said controlling device comprising a plurality of circuit-closers and a plurality of electromagnets having cores disconnected from but arranged to control the circuit-closers, said magnets being arranged to be energized by alternating current and to be actuated one by one from the same source of supply as the motor but at a lower voltage.

In testimony whereof I have signed my name to this specification in the presence of two subscribing witnesses.

DAVID LARSON.

Witnesses:
JOHN H. COYNE,
ERNEST W. MARSHALL.